US012291898B2

(12) United States Patent
Szegeny

(10) Patent No.: US 12,291,898 B2
(45) Date of Patent: May 6, 2025

(54) MOTOR VEHICLE LOCK

(71) Applicant: KIEKERT AKTIENGESELLSCHAFT, Heiligenhaus (DE)

(72) Inventor: Peter Szegeny, Engelskirchen (DE)

(73) Assignee: Kiekert AG, Heiligenhaus (DE)

( * ) Notice: Subject to any disclaimer, the term of this patent is extended or adjusted under 35 U.S.C. 154(b) by 138 days.

(21) Appl. No.: 18/002,331

(22) PCT Filed: Jun. 14, 2021

(86) PCT No.: PCT/DE2021/100505
§ 371 (c)(1),
(2) Date: Dec. 19, 2022

(87) PCT Pub. No.: WO2022/012709
PCT Pub. Date: Jan. 20, 2022

(65) Prior Publication Data

US 2023/0193665 A1 Jun. 22, 2023

(30) Foreign Application Priority Data

Jul. 15, 2020 (DE) ..................... 10 2020 118 721.1

(51) Int. Cl.
*E05B 77/34* (2014.01)
*E05B 77/40* (2014.01)
(Continued)

(52) U.S. Cl.
CPC .............. *E05B 77/34* (2013.01); *E05B 77/40* (2013.01); *E05B 81/06* (2013.01); *E05B 81/14* (2013.01);
(Continued)

(58) Field of Classification Search
CPC ... Y10T 292/1082; E05B 77/34; E05B 77/40; E05B 81/06; E05B 81/14; E05B 81/30; E05B 81/34; E05B 85/26; E05B 85/02
See application file for complete search history.

(56) References Cited

U.S. PATENT DOCUMENTS 5,125,702 A * 6/1992 Fukumoto .............. E05B 77/34 277/642
5,678,869 A 10/1997 Yoshikuwa
(Continued)

FOREIGN PATENT DOCUMENTS

CN 1963129 A * 5/2007 ............. E05B 79/20
CN 102822434 A * 12/2012 ............. E05B 77/34
(Continued)

OTHER PUBLICATIONS

DE102018129748A1 Espacenet machine translation description and claims (Year: 2024).*
(Continued)

*Primary Examiner* — Kristina R Fulton
*Assistant Examiner* — Steven A Tullia
(74) *Attorney, Agent, or Firm* — Renner, Otto, Boisselle & Sklar, LLP

(57) ABSTRACT

A motor vehicle lock comprising a locking mechanism having a rotary latch and at least one pawl, wherein the rotary latch can be latched in at least one latching position by means of the pawl; a release lever, wherein the locking mechanism can be transferred from the latching position into a release position by means of the release lever; and an electric drive unit for actuating the release lever, wherein the locking mechanism is arranged in a wet region of the motor vehicle lock, and at least part of the actuating mechanism for unlocking the locking mechanism is arranged in a dry region of the motor vehicle lock.

12 Claims, 1 Drawing Sheet

(51) Int. Cl.
*E05B 81/06* (2014.01)
*E05B 81/14* (2014.01)
*E05B 81/30* (2014.01)
*E05B 81/34* (2014.01)
*E05B 85/02* (2014.01)
*E05B 85/26* (2014.01)

(52) U.S. Cl.
CPC .............. *E05B 81/30* (2013.01); *E05B 81/34* (2013.01); *E05B 85/02* (2013.01); *E05B 85/26* (2013.01)

(56) References Cited

U.S. PATENT DOCUMENTS

| | | | | |
|---|---|---|---|---|
| 6,349,983 | B1 * | 2/2002 | Dupont | E05B 81/14 292/216 |
| 6,715,806 | B2 * | 4/2004 | Arlt | E05B 81/14 292/201 |
| 7,086,257 | B2 * | 8/2006 | Bucker | E05B 85/01 292/201 |
| 7,434,852 | B2 * | 10/2008 | Spurr | E05B 85/26 292/201 |
| 7,621,571 | B2 * | 11/2009 | Umino | E05B 81/64 292/201 |
| 7,637,542 | B2 * | 12/2009 | Suzumura | E05B 85/02 292/201 |
| 7,699,362 | B2 * | 4/2010 | Taga | E05B 81/25 292/201 |
| 8,196,974 | B2 * | 6/2012 | Konchan | E05B 85/02 292/216 |
| 8,870,247 | B2 * | 10/2014 | Yamagata | E05B 85/02 292/216 |
| 10,344,506 | B2 * | 7/2019 | Hernandez | E05B 81/24 |
| 10,641,017 | B2 * | 5/2020 | Ishiguro | E05B 85/02 |
| 11,441,339 | B2 * | 9/2022 | Iwata | E05B 81/04 |
| 11,519,205 | B2 * | 12/2022 | Woo | E05B 77/34 |
| 11,753,853 | B2 * | 9/2023 | Guevara Arreola | E05B 77/26 292/337 |
| 11,898,381 | B2 * | 2/2024 | Kitamura | E05B 77/34 |
| 2005/0140146 | A1 * | 6/2005 | Spurr | E05B 85/26 292/216 |
| 2009/0033104 | A1 * | 2/2009 | Konchan | B60J 5/0416 292/216 |
| 2014/0175813 | A1 | 6/2014 | Margheritti et al. | |
| 2015/0035300 | A1 * | 2/2015 | Taylor | E05B 9/00 74/89 |
| 2019/0017298 | A1 * | 1/2019 | Sardelli | E05B 77/34 |
| 2022/0025678 | A1 * | 1/2022 | Okawa | E05B 81/06 |

FOREIGN PATENT DOCUMENTS

| | | | | | |
|---|---|---|---|---|---|
| DE | 3933467 | A1 | | 2/1990 | |
| DE | 3934982 | A1 | | 5/1990 | |
| DE | 19545722 | A1 | | 4/1997 | |
| DE | 19944968 | A1 | | 6/2001 | |
| DE | 10006765 | A1 | | 8/2001 | |
| DE | 10100008 | A1 | * | 7/2002 | E05B 77/04 |
| DE | 20216847 | U1 | * | 4/2004 | E05B 77/26 |
| DE | 10100008 | B4 | * | 12/2004 | E05B 77/04 |
| DE | 10006765 | B4 | * | 5/2005 | E05B 77/26 |
| DE | 102004042444 | A1 | * | 3/2006 | E05B 77/28 |
| DE | 60210647 | T2 | * | 3/2007 | B60J 5/0416 |
| DE | 102007028957 | A1 | * | 12/2008 | E05B 81/25 |
| DE | 102008035534 | A1 | * | 3/2009 | B60J 5/0416 |
| DE | 202012103608 | U1 | | 10/2012 | |
| DE | 102019110480 | A1 | * | 11/2019 | E05B 77/28 |
| DE | 102018129748 | A1 | * | 5/2020 | |
| DE | 102019109488 | A1 | | 10/2020 | |
| DE | 102021102548 | A1 | * | 8/2021 | |
| DE | 102021118543 | A1 | * | 1/2023 | E05B 77/34 |
| EP | 0364936 | A2 | * | 4/1990 | E05B 85/02 |
| EP | 1304433 | A1 | * | 4/2003 | E05B 79/20 |
| EP | 1445404 | A2 | * | 8/2004 | E05B 77/34 |
| EP | 1447503 | A2 | * | 8/2004 | E05B 81/14 |
| EP | 1216334 | B1 | | 4/2009 | |
| EP | 4006273 | A1 | * | 6/2022 | E05B 77/34 |
| FR | 2775016 | A1 | | 8/1999 | |
| FR | 2806810 | A1 | * | 9/2001 | E05B 77/34 |
| FR | 2819003 | A1 | * | 7/2002 | E05B 77/34 |
| FR | 2825402 | A1 | | 12/2002 | |
| FR | 2925561 | A1 | * | 6/2009 | E05B 77/34 |
| FR | 2983227 | A1 | * | 5/2013 | E05B 77/34 |
| GB | 2204908 | A | * | 11/1988 | E05B 83/36 |
| JP | 2013083086 | A | * | 5/2013 | B60J 10/86 |
| JP | 2014009516 | A | * | 1/2014 | |
| JP | 2014095267 | A | * | 5/2014 | E05B 79/04 |
| JP | 2014105472 | A | * | 6/2014 | |
| JP | 6080518 | B2 | * | 2/2017 | |
| JP | 2017095954 | A | * | 6/2017 | E05B 77/34 |
| JP | 7331317 | B2 | * | 8/2023 | B60J 5/00 |
| WO | WO-0123693 | A1 | * | 4/2001 | E05B 77/34 |
| WO | WO-0220925 | A1 | * | 3/2002 | B22D 19/0009 |
| WO | WO-2012102209 | A1 | * | 8/2012 | B60J 10/86 |
| WO | WO-2015072576 | A1 | * | 5/2015 | E05B 77/34 |
| WO | WO-2015118916 | A1 | * | 8/2015 | E05B 77/34 |
| WO | WO-2016058586 | A1 | * | 4/2016 | E05B 77/34 |
| WO | WO-2017103175 | A1 | * | 6/2017 | E05B 77/34 |
| WO | WO-2018033175 | A1 | * | 2/2018 | E05B 77/34 |

OTHER PUBLICATIONS

International Search Report mailed Oct. 7, 2021, for priority International Patent Application No. PCT/DE2021/100505.

* cited by examiner

MOTOR VEHICLE LOCK

This application is a national phase of International Patent Application No. PCT/DE2021/100505 filed Jun. 14, 2021, which claims priority to German Patent Application No. 10 2020 118 721.1 filed Jul. 15, 2020, each of which is hereby incorporated herein by reference in its entirety.

FIELD OF DISCLOSURE

The invention relates to a motor vehicle lock—in particular, a motor vehicle side door lock—comprising a locking mechanism having a rotary latch and at least one pawl, wherein the rotary latch can be latched in at least one latching position by means of the pawl; a release lever, wherein the locking mechanism can be transferred from the latching position into a release position by means of the release lever; and an electric drive unit for actuating the release lever.

BACKGROUND OF DISCLOSURE

In modern motor vehicle locking systems, locking mechanisms are primarily installed which latch into one another by the rotary latch and the pawl interlocking with each other, thus enabling a fixation of a component that is movably disposed on the motor vehicle. Depending upon the arrangement in the motor vehicle, single-stage or two-stage locking mechanisms are used. While it is more common to use single-stage locking mechanisms in covers or hatchbacks, the legislators oblige the vehicle manufacturers to equip side doors with two-stage locking mechanisms. In a first step, i.e., in a first latching position, the side door is held loosely, and in a second step, i.e., in a second latching position, the side door is in a completely closed operating position.

In order to further increase the comfort in motor vehicles, more and more electrically assisted functions are used in motor vehicles. Electric motors are installed in motor vehicle locking systems which then enable, for example, an electrical unlocking of the locking mechanism. The electric motor usually interacts with a transmission, wherein the gear stage then initiates an unlocking of the locking mechanism indirectly or directly. Such an electric drive unit is known, for example, from DE 10 2019 109 488.7.

DE 10 2019 109 488.7 discloses an electric drive unit consisting of an electric motor with a worm gear stage downstream of the electric motor. The gear wheel of the worm gear stage is equipped with a cylindrical lateral surface which extends as a ramp about an axis of rotation of the worm gear wheel. An actuating lever is in engagement with the lateral surface, wherein the actuating lever can, for example, cause or at least initiate an unlocking of a locking mechanism. By means of this electric drive unit, the operator of the motor vehicle can, for example, electrically unlock the motor vehicle lock so that an electrically-assisted opening of a side door can be realized.

At least the rotary latch in a motor vehicle lock is in engagement with a locking bolt or latch holder. The rotary latch and latch holder interact in such a way that the rotary latch can be pivoted around the latch holder and latches the locking mechanism by means of the pawl. The rotary latch is thus exposed to environmental influences and can, for example, come into contact with water due to rain. In order to protect the further components of the motor vehicle lock from environmental influences, it is known to subdivide the motor vehicle lock into a wet region and a dry region.

DE 20 2012 103 608 U1 discloses a motor vehicle lock in which the rotary latch is arranged in a wet region and the pawl is arranged in a dry region of the motor vehicle. Here, only a part of the pawl projects through an opening slot of the lock housing, wherein the width of the opening slot corresponds to the material thickness of the pawl. The latching arm of the pawl is thus the part of the pawl which extends into the wet region of the motor vehicle lock for engaging with the rotary latch.

SUMMARY OF DISCLOSURE

The solutions known from the prior art have proven of value so far. However, the increasing electrification of the motor vehicle lock makes it necessary to completely separate the dry region from the region which is exposed to the environmental influences. This is where the invention comes in.

The object of the invention is to protect the electronic or electrical components of the motor vehicle lock as much as possible from environmental influences. According to the invention, an improved and structurally simple and thus cost-effective motor vehicle lock is to be provided, with which environmental influences are kept away from the region of the electronics or electrical system.

The object is achieved by the features of independent claim 1. Advantageous forms of the invention are indicated in the subclaims. It should be noted that the exemplary embodiments described below are not restrictive; rather, any variation of the characteristics described in the description and subclaims is possible.

According to claim 1, the object of the invention is achieved in that a motor vehicle lock—in particular, a motor vehicle side door lock—is provided, comprising a locking mechanism having a rotary latch and at least one pawl, wherein the rotary latch can be latched in at least one latching position by means of the pawl; a release lever, wherein the locking mechanism can be transferred from the latching position into a release position by means of the release lever; and an electric drive unit for actuating the release lever, wherein the locking mechanism is arranged in a wet region of the motor vehicle lock, and at least part of the actuating mechanism for unlocking the locking mechanism is arranged in a dry region of the motor vehicle lock. Due to the design according to the invention of the motor vehicle lock and, in particular, of the arrangement of the locking mechanism in the wet region, and due to the separation such that the actuating mechanism is arranged in the dry region, a further separation between the electric drive and the wet region can be made.

The actuating mechanism can, for example, consist of a release lever acting directly on the pawl and disengaging the pawl from the rotary latch. The release lever can be driven either directly via the electric drive or by means of an actuating lever, a gear stage. The locking mechanism is located in the wet region, i.e., it is subject to the environmental influences and can come into operation due to moisture, dust, and/or temperature influences. These environmental influences must be kept away from the electronics area.

A lock housing is used for separating the wet region and the dry region, which lock housing can, on the one hand, hold and/or contain the electrical and/or electronic components, and can at the same time serve for receiving further components of the motor vehicle lock. The lock housing consists primarily of a housing part and a housing cover. Of course, the housing can also be constructed in several parts and consist of two, three, or more parts. In order to realize the concept according to the invention, it is important that at least a part of the actuating mechanism for unlocking the locking mechanism be arranged in the dry region of the lock housing.

A motor vehicle lock according to the invention is understood to also include such locks as are used in side doors, hatches, covers, or sliding doors, i.e., wherever components mounted movably on the motor vehicle must be fixed in a locking position in order to enable safe use of the motor vehicle. However, the motor vehicle lock according to the invention preferably relates to a motor vehicle side door.

The locking mechanism can be designed as a single-latch or double-latch locking mechanism. From the latest developments, locking mechanisms with rolling locking mechanism parts, such as a ball, are also known. In the case of a single-latch locking mechanism, there is only one latching position in which the pawl holds the rotary latch. In the case of double-latch locking mechanisms, there is, in addition to a main latching position, also a pre-latching position, so that the rotary latch and pawl can interact in two latching positions. Here, the release lever interacts with the locking mechanism in such a way that the release lever disengages the latched locking mechanism. In this case, the pawl is moved out of the engagement region with the rotary latch. It is known to also use several pawls. For example, when there is an opening torque for the locking mechanism in the main latching position, the pawl can be held via a further pawl. This further pawl is then referred to as a latching or blocking lever.

The electric drive unit preferably consists of a DC motor, on the output shaft of which a gear wheel is mounted that interacts with a further gear wheel in order to initiate a movement in the motor vehicle lock. It is conceivable that the gear wheel attached to the electric motor be in direct engagement with the release lever; however, there is preferably at least one gear stage arranged between the driving gear and the release lever. The preferred gear stage is a worm gear stage.

In one embodiment variant of the invention, the drive unit is formed at least from an electric motor and a gear stage, wherein the gear stage has an actuating lever. A worm which cogs with a worm gear is arranged downstream of the electric motor on the output shaft of the electric motor. The worm gear in turn drives the actuating lever; the pawl can be actuated directly by means of the actuating lever, but it is also conceivable for the actuating lever to be in engagement with a release lever. Using an actuating lever also makes it possible to position the electric drive and the worm gear at a distance from the locking mechanism in the motor vehicle lock. In particular, a further transmission can be introduced into the drive chain by the interaction of worm gear and actuating lever. The required force for actuating the pawl can thus be influenced or adjusted.

The actuating lever can be brought into engagement with the release lever. The release lever can preferably be connected to the actuating lever in a form-fitting manner. For this purpose, the release lever can have, for example, an opening into which the actuating lever can be inserted. Of course, it is also conceivable for the actuating lever and the release lever to be connected in a bonded and/or form-fitting and/or force-fitting manner. The actuating lever is preferably inserted into the release lever so that a torque can be introduced into the release lever by means of the actuating lever. The actuating lever is driven by the worm gear and preferably performs a pivoting movement, so that a pivoting or rotational movement is also available on the release lever in order to release the pawl from the engagement region with the rotary latch. Worm, worm gear, actuating lever, and release lever are preferably made of plastic.

The actuating lever can be firmly connected to the release lever in order to transmit a drive power. A firm connection between actuating lever and release lever makes it possible to provide a high degree of safety when actuating the release lever. The unlocking of the locking mechanism is essential for a function of a motor vehicle lock, because otherwise a motor vehicle side door, for example, cannot be opened again. It is vital to be able to actuate the actuating chain of electric motor via worm gear, actuating lever, and release lever at any time in order to ensure secure unlocking of the locking mechanism. Particularly in today's motor vehicles, in which an exterior door handle is in part dispensed with, the actuating chain for unlocking the locking mechanism is the primary—and in most cases the only—way to unlock the locked locking mechanism. Mechanical redundancy can then be dispensed with. A preferred embodiment of the invention results if the actuating lever extends from the dry region into the wet region in the motor vehicle lock. The motor vehicle lock is subdivided into a wet region and a dry region.

The dry region is preferably formed by a housing wall of the motor vehicle lock. In this embodiment, the locking mechanism consisting of rotary latch and pawl, as well as the release lever, are located in a wet region of the motor vehicle lock, and the actuating lever extends through the housing, thus enabling a force transmission from the electric motor to the wet region with the locking mechanism. The actuating lever thus has several functions. On the one hand, the actuating lever transmits the drive power for unlocking the locking mechanism, and, on the other, the actuating lever allows for the release mechanism and drive mechanism to be spaced apart from one another; moreover, a connection between the dry region and the wet region can be produced by means of the actuating lever.

It has been found to be particularly advantageous in this embodiment that a seal is arranged in a region of an opening for the actuating lever. This design according to the invention of the motor vehicle lock forms a major advantage. By using a seal in the passage region through the housing, i.e., through the connecting opening between wet region and dry region, a secure separation between wet region and dry region can be achieved. The aforementioned advantages of the actuating lever are complemented by the use of a seal, in that the advantages can be combined with the realization of a complete sealing between dry region and wet region. The actuating lever extends from the drive unit in the dry region and into the release mechanism in the wet region of the motor vehicle lock. The actuating lever extends through the plastic housing of the motor vehicle lock and serves as a transmission member in the actuating chain for unlocking the locking mechanism. If a seal is now inserted on the actuating lever and, in particular, in the region of the opening, secure sealing can be ensured, as a result of which a maximum degree of operational safety for the electric drive can be provided.

It is particularly advantageous if the seal is designed as a sealing ring. The actuating lever is preferably constructed to be axially symmetrical in the region of the opening and transmits the drive torque of the electric motor to the release lever or, in a different embodiment, to the pawl. If the seal is designed as a sealing ring, and if the actuating lever has a cylindrical shape in the region of the opening, this provides a structurally simple and thus cost-effective possibility for applying a seal in the motor vehicle lock. Using a sealing ring allows not only for a structurally simple design, but also enables easy assembly during the manufacture of the motor vehicle lock.

In one embodiment variant, the seal can be mounted on the actuating lever. In addition to fastening the seal in the motor vehicle lock, i.e., for example, in a recess of the housing, it is also possible to mount, fasten, insert, and/or integrate the sealing ring directly on or into the actuating lever. This in turn offers the advantage that no further structural measures are necessary in order to arrange or hold the seal in the motor vehicle lock. This simplifies the structural design of the motor vehicle lock overall.

It has proven to be particularly advantageous if the seal can be inserted into the release lever at least in regions. If the release lever is additionally designed such that the seal extends into the release lever at least in regions, a compact design can be combined with the high advantages of being sealed. On the one hand, it is possible to ensure a secure transmission of power between the release lever and the actuating lever and, on the other, to combine a compact design with structural advantages. On the one hand, a high degree of tightness between the dry region and the wet region can thus be achieved, and, on the other, a reliable transmission of power with minimal structural installation space. Moreover, by integrating the seal into the release lever, the seal can be also protected. Since the wet region is subject to environmental influences, as stated above, and the seal is made of an elastomeric plastic at least in regions and at least in the region of a sealing lip, protection for the seal can be provided by integrating the seal into a recess on the release lever.

In an alternative embodiment, the seal can be integrated, and in a bonded manner, into the motor vehicle lock. In particular, the seal can be integrated into the release lever or the actuating lever or the housing by means of a two-component injection-molding process. A one-piece configuration of the seal with a further component of the motor vehicle lock reduces the amount of assembly components, and can at the same time serve for very accurate positioning of the seal.

Overall, this results in a structurally favorable embodiment which can be combined with the advantages of tightness in the interior of the motor vehicle lock. In particular, on the one hand, a secure transmission of power can be ensured in the transition between wet region and dry region and, on the other, a maximum degree of tightness.

BRIEF DESCRIPTION OF DRAWINGS

The invention is explained in more detail below with reference to the attached drawings on the basis of a preferred exemplary embodiment. However, the principle applies that the exemplary embodiment does not limit the invention, but is merely an advantageous embodiment. The features shown can be implemented individually or in combination with further features of the description as well as the claims—individually or in combination.

In the drawings.

DETAILED DESCRIPTION

Figure 1:
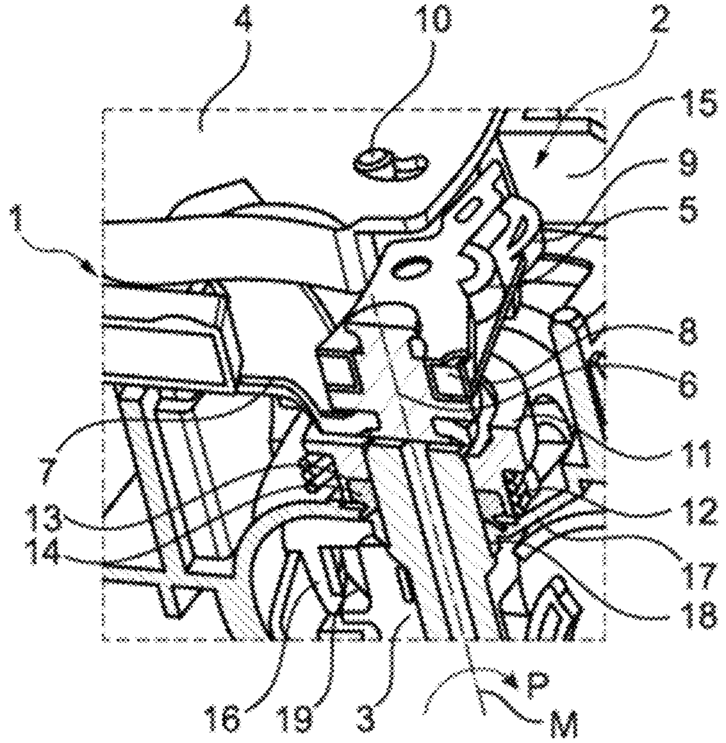
FIG. 1 shows a three-dimensional view of the actuating chain for unlocking the locking mechanism, wherein a section through the actuating lever and a pivot axis of the pawl is shown.

FIG. 1 shows a motor vehicle lock 1 in a three-dimensional view and, in the region of a locking mechanism 2, in a section through the actuating lever 3. The locking mechanism 2 comprises a rotary latch 4 and a pawl 5. The pawl 5 is supported on an axis 6, wherein the axis 6 is received on one side in a reinforcement plate 7. The axis 6 is supported on both sides, wherein, for better clarification of the invention, the lock case for opposite mounting of the axis 6 is not shown. The pawl 5 has a metal core 8 and is provided with a plastic coating 9. The plastic coating 9 can in turn have damping properties. The pawl 5 interacts indirectly with the rotary latch 4, wherein a pivotably mounted, rolling blocking element 10 is arranged in the rotary latch 4. The locking mechanism 2 in the form shown in FIG. 1 thus consists of the pawl axis 6, the pawl 5, the blocking element 10, and the rotary latch 4. The locking mechanism 2 can have further components.

A release lever 11 acts on the pawl 5. The release lever 11 is provided with a return spring 12 and has a recess 13 into which a seal 14 is inserted. The seal 14 itself is mounted on the actuating lever 3 and seals the wet region 15 against the dry region 16 in the motor vehicle lock 1. The actuating lever 3 extends from the wet region 15 into the dry region 16, wherein the actuating lever extends through the housing of the motor vehicle lock 1. The housing 17 has an opening 18 for this purpose. The opening 18 can at the same time form a bearing point for the actuating lever 3. A lever arm 19 is integrally formed on the actuating lever 3 and can be brought into engagement with a worm gear 20.

FIG. 1 shows a main latching position of the locking mechanism 2, wherein the pawl 5 is in engagement with the rotary latch 4 and in particular with the blocking element 10. The pawl 5 is mounted in the axis 6 and held in the reinforcement plate 7 and the lock case. The pawl and actuating lever 3, as well as the release lever 11, are accommodated in the motor vehicle lock 1 so as to be pivotable about a central axis M. If the actuating lever 3 is pivoted around the central axis M, wherein the actuating lever 3 is driven via the lever arm 19 and the electric motor, the actuating lever 3 also pivots the release lever 11 in the direction of arrow P in FIG. 1 in a clockwise direction. A driving contour on the release lever 11 then causes the pawl 5 to pivot about the central axis M so that the pawl 3 and the rotary latch 4 or blocking element 10 are disengaged. In this case, the engagement between pawl 5 and rotary latch 4 is not undone, but the pawl 3 rolls on the blocking element 10 so that easy and quiet opening can be achieved.

Figure 2:
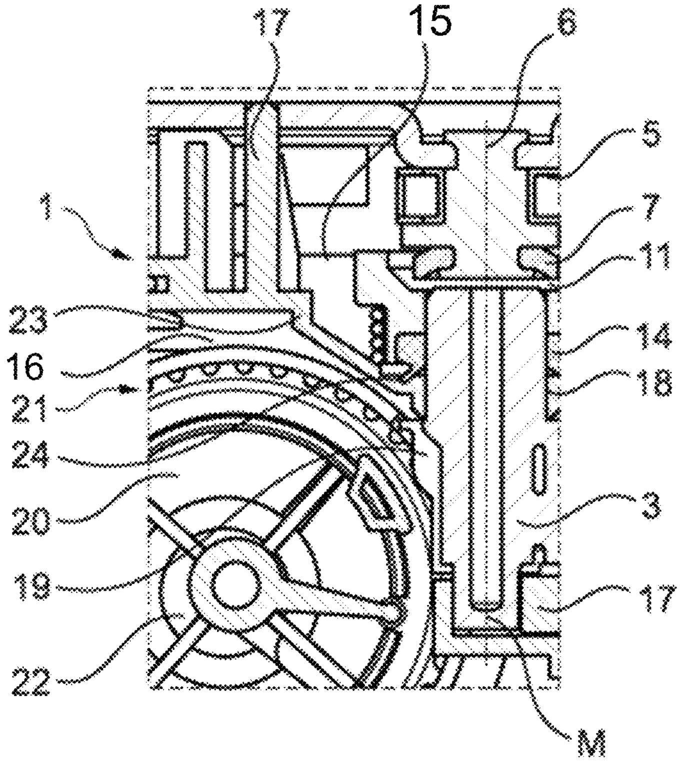
FIG. 2 shows a further view of a section through the actuating lever and the axis of the pawl, to illustrate the position and function of the seal on the actuating lever.

FIG. 2 shows a sectional view of the motor vehicle lock 1 with a view of the actuating chain 21. Shown is a section through the housing 17, the pawl 5, the axis 6, the reinforcement plate 7, the release lever 11, the seal 8, the actuating lever 3, and the worm gear wheel 22.

The actuating lever 3 is pivotably accommodated, on the one hand, in the opening 18 and, on the other, in the housing 17. The wet region 15 and the dry region 16 are separated by a housing wall 23, wherein the opening 18 is penetrated by the actuating lever 3. The position of the seal 14, which in this embodiment is accommodated in the release lever 11 and seals the opening 18 against the housing wall 23 by means of a sealing lip 24, can be clearly seen.

The worm gear 20 drives the actuating lever 3, wherein a contour on the worm gear 20 acts on the lever arm 19, and thus effects a pivoting of the actuating lever. The actuating lever 3 and the release lever 11 are firmly connected to one another in a form-fitting manner, so that the torque introduced into the release lever 11 by the actuating lever 3 can be used for actuating the pawl 5, and thus for unlocking the locking mechanism 2.

In any case, the solution according to the invention makes available a secure means for providing, on the one hand, a structurally favorable option for driving the release lever 11 or for unlocking the locking mechanism 2, and, on the other, a secure sealing in the motor vehicle lock can be ensured by means of the seal 14. In particular, the electric drive or the electrical components in the motor vehicle lock 1 can thus be accommodated in the motor vehicle lock 1 so as to be protected from environmental influences.

LIST OF REFERENCE SIGNS

1 Motor vehicle lock
2 Locking mechanism
3 Actuating lever
4 Rotary latch
5 Pawl
6 Axis
7 Reinforcement plate
8 Metal core
9 Plastic coating
10 Blocking element
11 Release lever
12 Return spring
13 Recess
14 Seal
15 Wet region
16 Dry region
17 Housing
18 Opening
19 Lever arm
20 Worm gear
21 Actuating chain
22 Worm gear wheel
23 Housing wall
24 Sealing lip
M Center axis
P Arrow

The invention claimed is:

1. A motor vehicle lock comprising:

a locking mechanism having a rotary latch and a pawl, wherein the rotary latch is latched in a latching position by the pawl;

a release lever, wherein the locking mechanism is transferred from the latching position into a release position by the release lever acting on the pawl to disengage the pawl from the rotary latch;

an electric drive unit comprising an actuating mechanism for actuating the release lever, wherein the locking mechanism is arranged in a wet region of the motor vehicle lock, wherein at least part of the actuating mechanism for unlocking the locking mechanism extends from the wet region to a dry region of the motor vehicle lock that is separated from the wet region, wherein the release lever is arranged in the wet region and is connected to the at least part of the actuating mechanism in the wet region;

a lock housing that separates the wet region from the dry region; and a seal inserted into a recess of the release lever configured to seal the dry region from the wet region, wherein the seal includes a first portion retained in the recess of the release lever to sealingly engage the at least part of the actuating mechanism in the wet region and a second portion comprising a sealing lip that extends from the first portion to sealingly engage a wall of the lock housing.

2. The motor vehicle lock according to claim 1, wherein the electric drive unit further comprises an electric motor and a gear stage, wherein the gear stage is a component of the actuating mechanism.

3. The motor vehicle lock according to claim 2, wherein the gear stage has an actuating lever.

4. The motor vehicle lock according to claim 3, wherein the actuating lever is the at least part of the actuating mechanism that extends from the wet region to the dry region.

5. The motor vehicle lock according to claim 4, wherein the actuating lever is firmly connected to the release lever in order to transmit a drive power to the release lever.

6. The motor vehicle lock according to claim 4, wherein the seal is arranged in a region of an opening of a lock housing for the actuating lever.

7. The motor vehicle lock according to claim 1, wherein the seal is a sealing ring.

8. The motor vehicle lock according to claim 4, wherein the seal further engages the actuating lever.

9. The motor vehicle lock according to claim 6, wherein the seal is integrated into the release lever by a two-component injection-molding process.

10. The motor vehicle lock according to claim 1, wherein the lock housing houses electrical components of the electric drive unit within the dry region.

11. The motor vehicle lock according to claim 2, wherein the gear stage has a worm gear.

12. The motor vehicle lock according to claim 4, wherein the actuating lever extends from the electric drive unit located within the dry region to the release lever located within the wet region.

* * * * *